United States Patent [19]

Sun

[11] Patent Number: 4,529,005

[45] Date of Patent: Jul. 16, 1985

[54] FLUID TAP

[76] Inventor: Ben Sun, No. 6-2, Alley 1, Lane 8, Sec. 2 Shuang Shih Rd., Tai Chung, Taiwan

[21] Appl. No.: 620,914

[22] Filed: Jun. 15, 1984

[51] Int. Cl.³ ............................................. F16K 47/04
[52] U.S. Cl. ................................ 137/625.32; 251/159; 251/161; 251/174
[58] Field of Search ........................ 137/625.3, 625.32; 251/159, 161, 174

[56] References Cited

U.S. PATENT DOCUMENTS

| 691,529 | 1/1902 | Brophy | 137/625.32 X |
| 1,608,120 | 11/1926 | Price | 137/625.32 |
| 4,077,426 | 3/1978 | Karie | 251/174 X |
| 4,314,581 | 2/1982 | Schnock | 137/625.32 X |

FOREIGN PATENT DOCUMENTS

| 348029 | 2/1922 | Fed. Rep. of Germany | 137/625.32 |

*Primary Examiner*—Harold W. Weakley
*Attorney, Agent, or Firm*—Flehr, Hohbach, Test, Albritton & Herbert

[57] ABSTRACT

A fluid tap includes a first cylinder having a first axial hole adapted to be communicating with a fluid source and a first radial through hole in communication with the first axial hole for discharging therefrom the fluid coming from the fluid source and a second cylinder having a second axial hole for rotatably, securely and sealingly receiving therein the first cylinder and a second radial through hole capable of in alignment with the first radial through hole so that the wall defining the second axial hole will prevent the first radial through hole from discharging therefrom the fluid when the first and second cylinders are in a first relative position that the first and second through holes are incapable of communicating with each other and the second radial through hole will discharge therefrom the fluid when the first and second cylinders are in a second relative position that the first and second radial through holes are in communication.

6 Claims, 4 Drawing Figures

FLUID TAP

BACKGROUND OF THE INVENTION

The present invention relates to a valve, and more particularly to a fluid tap.

To fully open or close a known fluid tap of the rotating type, it is necessary that many turns on the handle thereof must be rotated. Besides, there is a global valve, the globe within which is provided with a through hole for regulating a fluid intended to be controlled. However, the gasket in direct contact with the globe is apt to be worn away and thus the global valve is to suffer the problem of fluid leakage. It is therefore attempted by the applicant to deal with the situations set out above.

SUMMARY OF THE INVENTION

It is therefore an object of the present invention to provide a fluid tap capable of quick control.

It is therefore another object of the present invention to provide a leakage-proof fluid tap.

It is further an object of the present invention to provide a fluid tap which will mitigate the problem of the wearing away of a gasket which is referred to as the engaging piece hereinafter.

According to the present invention, a fluid tap includes a first cylinder having a first axial hole adapted to be communicating with a fluid source and a first radial through hole in communication with the first axial hole for discharging therefrom the fluid coming from the fluid source and a second cylinder having a second axial hole for rotatably, securely and sealingly receiving therein the first cylinder and a second radial through hole capable of in alignment with the first radial through hole so that the wall defining the second axial hole will prevent the first radial through hole from discharging therefrom the fluid when the first and second cylinders are in a first relative position that the first and second through holes are incapable of communicating with each other and the second radial through hole will discharge therefrom the fluid when the first and second cylinders are in a second relative position that the first and second radial through holes are in communication.

Preferably the first cylinder has an annular protrusion, the second cylinder has a first shoulder and the fluid tap further includes a third cylinder having a third axial hole having second shoulder for seating thereon the annular protrusion for receiving therein the first and second cylinders, a third radial hole in alignment with the first radial through hole and a first thread and a fourth cylinder having a fourth axial through hole having a third shoulder capable of matching with the first shoulder and a second thread threadingly engagable with the first thread so that the fourth cylinder will rotatably retain the second cylinder within the fourth axial through hole without axial translation when the first thread fully engages with the second thread.

Preferably the fluid tap further comprises a fifth hollow cylinder which encloses the outer periphery of the second cylinder, has a fifth radial through hole in alignment with the first radial through hole and is mounted between the fourth cylinder and the annular protrusion so that when the second thread threadingly engages with the first thread the fourth cylinder will urge the fifth cylinder toward the annular protrusion which thus, is securely seated on the second shoulder.

Preferably within the first radial through hole there are provided with a spring and two engaging pieces diametrically disposed for seating therebetween the spring, capable of smoothly and sealingly contacting with the wall and each of which has a through hole in alignment with the fifth radial through hole.

Preferably the first cylinder has two radial and outward first protrusions diametrically disposed at its top end and the top wall of the second axial hole has two radial, inward and diametrically disposed second protrusions and thus forms two sectorial indentations thereon each of which constitutes a place which each of the first protrusions can rotate thereon so that the second cylinder can urge the first cylinder to rotate for the adjustment of the aligning condition of the first, second and fifth radial through holes when the first protrusions contact with the second protrusions.

Preferably the second cylinder further includes a head for being gripped. Preferably te upper portion of the fourth cylinder is shaped to be hexagonal.

Preferably the third axial hole has an enlarged portion which encloses around the outer periphery of the fifth cylinder to communicate with the fifth radial through hole.

The present invention may best be understood with reference to the accompanying drawings, in which:

DETAILED DESCRIPTION OF THE PREFERRED EMBODIMENT

Figure 1:
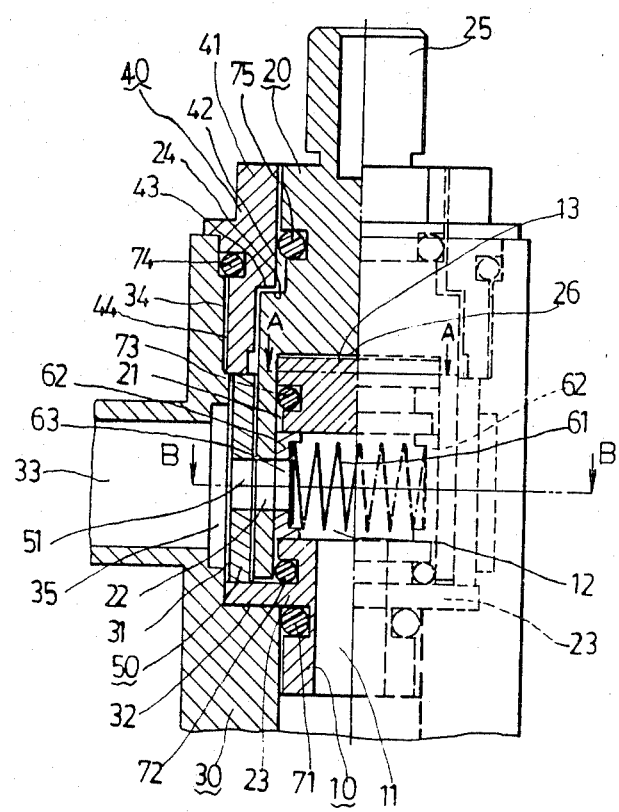
FIG. 1 is a longitudinal section view showing a preferred embodiment of a fluid tap of the present invention.

Referring now to FIG. 1, there is shown a longitudinal section view of a fluid tap of the present invention which includes a first cylinder 10, a second cylinder 20, a third cylinder 30, a fourth cylinder 40 and a fifth cylinder 50. First cylinder 10 has a first axial hole 11 communicating with a fluid source, a first radial through hole 12 in communication with first axial hole 11 for discharging therefrom the fluid coming from the fluid source and an annular protrusion 23. Second cylinder 20 has a second axial hole 21 for rotatably receiving therein first cylinder 10, a second radial through hole 22 in alignment with first radial through hole 12, a first shoulder 24 and a handle-like member, such as head 25 for being gripped. Third cylinder 30 has a third axial hole 31, which has a second shoulder 32 for seating thereon annular protrusion 23, for receiving therein first and second cylinders 10 & 20, a third radial hole 33 in alignment with first radial through hole 12 and a first thread 34. Fourth cylinder 40, the upper portion 41 of which is shaped to be hexagonal, has a fourth axial through hole 42 having a third shoulder 43 capable of matching with first shoulder 24 and a second thread 44 threadingly engagable with first thread 34. Fifth cylinder 50 which encloses the outer periphery of second cylinder 20 and has a fifth radial through hole 51 in alignment with first radial through hole 12 is mounted between fourth cylinder 40 and annular protrusion 23 and enclosed by an enlarged portion 35 of axial hole 31. In addition, five O-rings 71, 72, 73, 74 & 75 are respectively provided on suitable situations as shown in the figure for the sealing function.

Within first radial through hole 12, there are provided with a spring 61 and two engaging pieces 62 which are diametrically disposed for seating therebetween sping 61 and capable of smoothly and sealingly contacting with the wall which defines second axial hole 21 and each of engaging pieces 62 has a through hole 63 in alignment with fifth radial through hole.

Figure 2:
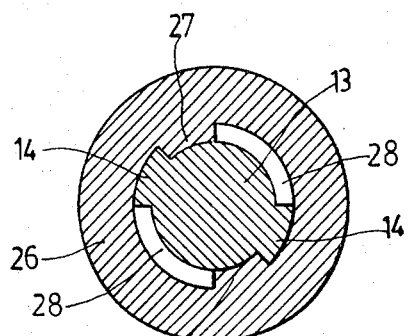
FIG. 2 is a cross-section view taken along line A—A in FIG. 1.

Referring now to FIG. 2 which is a cross-section view taken along line A—A in FIG. 1 and shows that the top portion 13 of first cylinder 10 has two radial and outward first protrusions 14 and that the top wall 26 of second axial hole 21 has two radial, inward and diametrically disposed second protrusions 27 and thus forms two sectorial indentations each of which constitutes a place which each of first protrusions 14 can rotate thereon.

In assembling the present fluid tap, the following procedures can be followed:

(1) Mount spring 61 and engaging pieces 62 within first radial hole 12 permitting through holes in alignment with first radial hole 12.

(2) Mount first cylinder 10 within second axial hole 21.

(3) Mount first and second cylinders 10 & 20 into third axial hole 31 to seat annular protrusion 23 on second shoulder 32 and with first protrusions 14 contacting with second protrusions 27, second cylinder 20 can urge first cylinder 10 to rotate for adjusting the aligning condition of first, second and third radial holes 12, 22 & 33 if necessary.

(4) Fit fifth cylinder 50 into third axial hole 31 permitting fifth radial through hole 51 in alignment with first radial hole 12.

(5) Threadingly engage fourth cylinder 40 with third cylinder 30 to urge fifth cylinder 50 toward annular protrusion 23 which thus, is securely seated on second shoulder 32.

Figure 3:
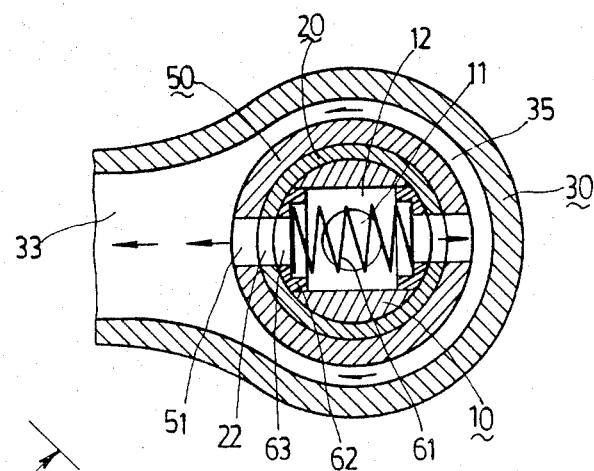
FIG. 3 is a cross-section view taken along line B—B in FIG. 1.
Figure 4:
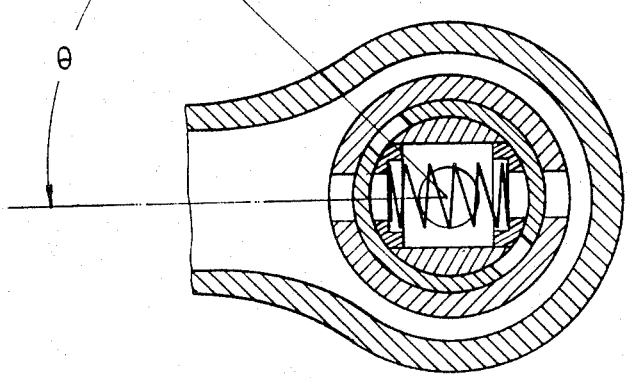
FIG. 4 is a cross-section view different from FIG. 3 in that a second cylinder of a fluid tap of the present invention is rotated an angle relative to a first cylinder of a fluid tap of the present invention.

FIGS. 3 & 4 are cross-sectional views taken along the line B—B in FIG. 1. FIG. 3 shows the fluid tap being in an open condition that first, second, fifth and third radial holes are in an accurate aligning condition. FIG. 4 shows the fluid tap being in a closed condition so that first radial through hole 12 is incapable of communicating with second radial through hole 22 by rotating second cylinder 20 an angle 0 relative to first cylinder 10.

While, the present invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A Fluid Tap comprising a first cylinder having a first axial hole adapted to be communicating with a fluid souce and a first radial through hole in communication with said first axial hole for discharging therefrom the fluid coming from said fluid source, a second cylinder having a second axial hole for rotatably, securely and sealingly receiving therein said first cylinder and a second radial through hole capable of in alignment with said first radial through hole whereby the wall defining said second axial hole will prevent said first radial through hole from discharging therefrom said fluid when said first and second cylinders are in a first relative position that said first and second through holes are incapable of communicating with each other and said second radial through hole will discharge therefrom said fluid when said first and second cylinders are in a second relative position that said first and second radial through holes are in communication, said first cylinder having an annular protrusion, said second cylinder having a first shoulder, and said fluid tap further including a third cylinder having a third axial hole and a second shoulder for seating thereon said annular protrusion for receiving therein first and second cylinders, a third radial hole in alignment with said first radial through hole and a first thread and a fourth cylinder having a fourth axial through hole with a third shoulder capable of matching with said first shoulder and a second thread threadingly engagable with said first thread whereby said fourth cylinder will rotatably retain said second cylinder within said fourth axial through hole without axial translation when said first thread fully engages with said second thread, a fifth hollow cylinder which encloses the outer periphery of said second cylinder, the fifth cylinder having a fifth radial through hole in alignment with said first radial through hole and which is mounted between said fourth cylinder and said annular protrusion whereby when said second thread threadingly engages with said first thread said fourth cylinder will urge said fifth cylinder toward said annular protrusion which is thereby securely seated on said second shoulder.

2. A fluid tap according to claim 1 wherein within said first radial through hole there are provided with:
a spring; and
two engaging pieces diametrically disposed for seating therebetween said spring, capable of smoothly and sealingly contacting with said wall and each of which has a through hole in alignment with said fifth radial through hole.

3. A fluid tap according to claim 2 wherein:
said first cylinder has two radial and outward first protrusions diametrically disposed at its top end; and the top wall of said second axial hole has two radial, inward and diametrically disposed second protrusions and thus forms two sectorial indentations each of which constitutes a place which each of said first protrusions can rotate thereon whereby said second cylinder can urge said first cylinder to rotate for the adjustment of the aligning condition of said first, second and fifth radial through holes when said first protrusions contact with said second protrusions.

4. A fluid tap according to claim 3 wherein said second cylinder further includes a head for being gripped.

5. A fluid tap according to claim 4 wherein the upper portion of said fourth cylinder is shaped to be hexagonal.

6. A fluid tap according to claim 5 wherein said third axial hole has an enlarged portion which encloses around the outer periphery of said fifth cylinder to communicate with said fifth radial through hole.

* * * * *